United States Patent [19]

Sirat et al.

[11] Patent Number: 5,081,541
[45] Date of Patent: Jan. 14, 1992

[54] INCOHERENT LIGHT HOLOGRAPHIC METHOD AND APPARATUS FOR STUDYING GROUND RELIEF

[75] Inventors: Gabriel Sirat; Henri Maitre, both of Paris, France

[73] Assignee: Etat Francais, represente par le Ministre des Postes, Telecommunication et de l'Espace (Centre National d'Etudes des Telecommunications), France

[21] Appl. No.: 511,552

[22] Filed: Apr. 20, 1990

[30] Foreign Application Priority Data

Apr. 21, 1989 [FR] France ................. 8905345

[51] Int. Cl.⁵ .................................. G03H 1/28
[52] U.S. Cl. ........................... 359/30; 359/1; 359/495
[58] Field of Search ............. 350/3.6, 3.73, 3.77, 350/3.83, 3.84, 3.85, 3.86, 401, 162.13, 162.14

[56] References Cited

U.S. PATENT DOCUMENTS 3,514,177 5/1970 Lohmann.
4,602,844 7/1986 Sirat et al. ................. 350/3.83
4,976,504 12/1990 Sirat et al. ................. 350/3.73

OTHER PUBLICATIONS

"Conoscopic Holograms", Sirat et al., *Optics Communications*, vol. 65, No. 4, 15 Feb. 1988, pp. 243–249.
"One-Dimensional Holography with Spatially Incoherent Light", Bryngdahl et al., *Journal of the Opt. Soc. of Am.*, vol. 58, No. 5, May 1968, pp. 625–628.
"Wavefront Reconstruction for Incoherent Objects", Lohamann, *J. Opt. Soc. of Am.*, vol. 55, No. 11, Nov. 1965, pp. 1555–1556.

*Primary Examiner*—Bruce Y. Arnold
*Assistant Examiner*—J. P. Ryan

[57] ABSTRACT

A holographic method of the type implementing a conoscopic system including a birefrigent crystal inserted between two polarizers and a photosensitive element, wherein the method includes a step consisting in inserting one-dimensional optical means on the path of the light rays such that the conoscopic system only collects light that is parallel or quasi-parallel to a plane including the axis of the conoscopic system. The invention also provides apparatus for implementing the method.

17 Claims, 3 Drawing Sheets

FIG.2 HOLOGRAM OF A POINT

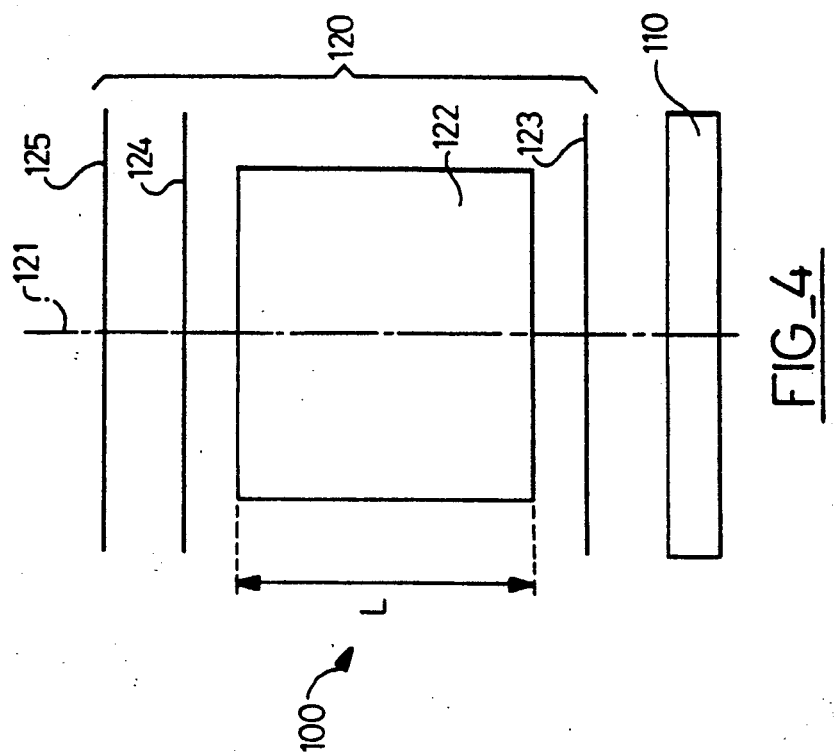
FIG_4
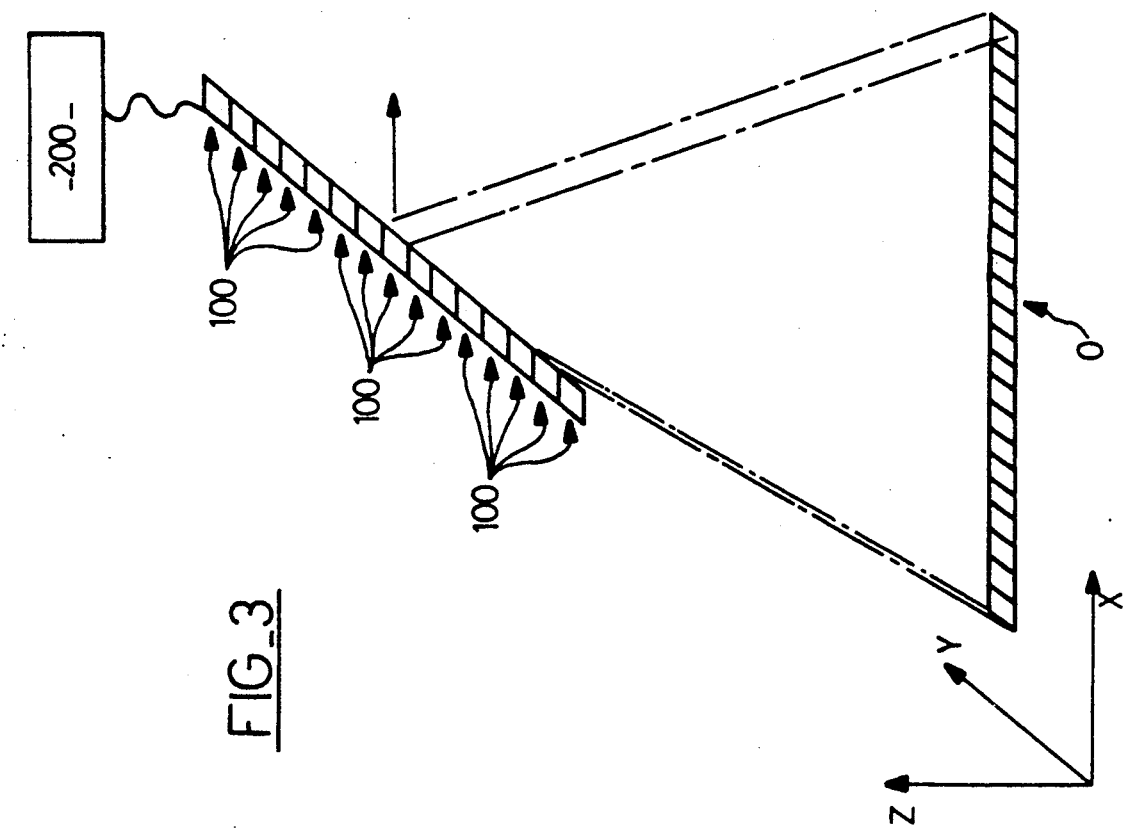
FIG_3

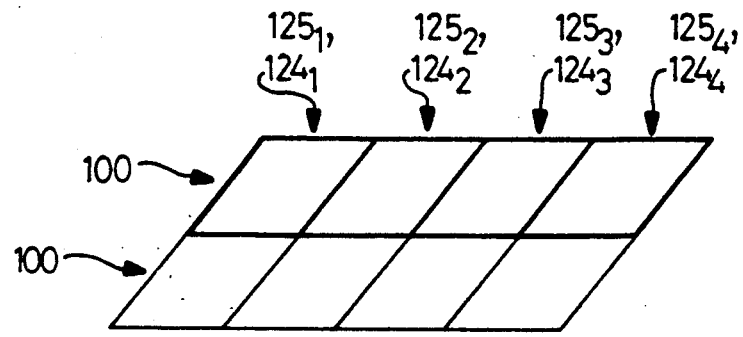
FIG_5
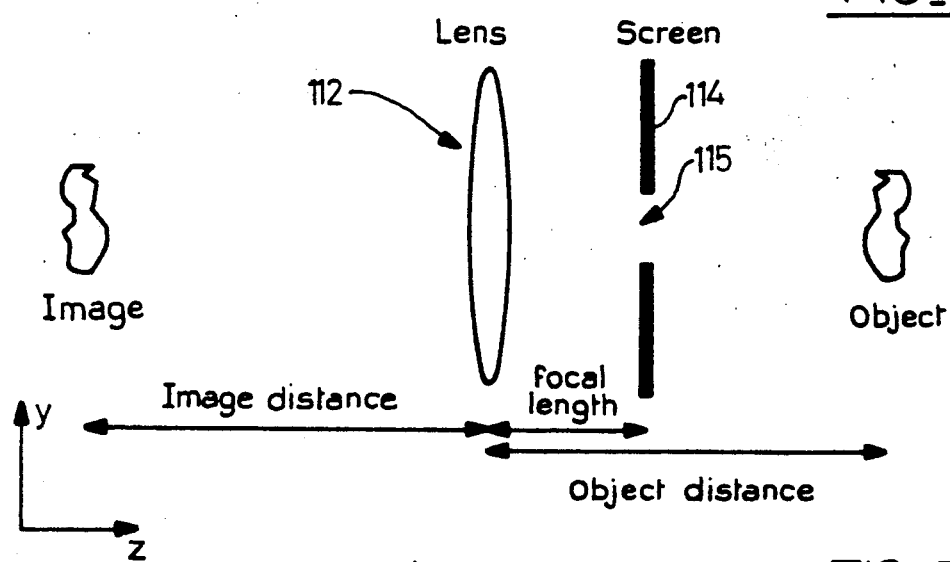
FIG_6
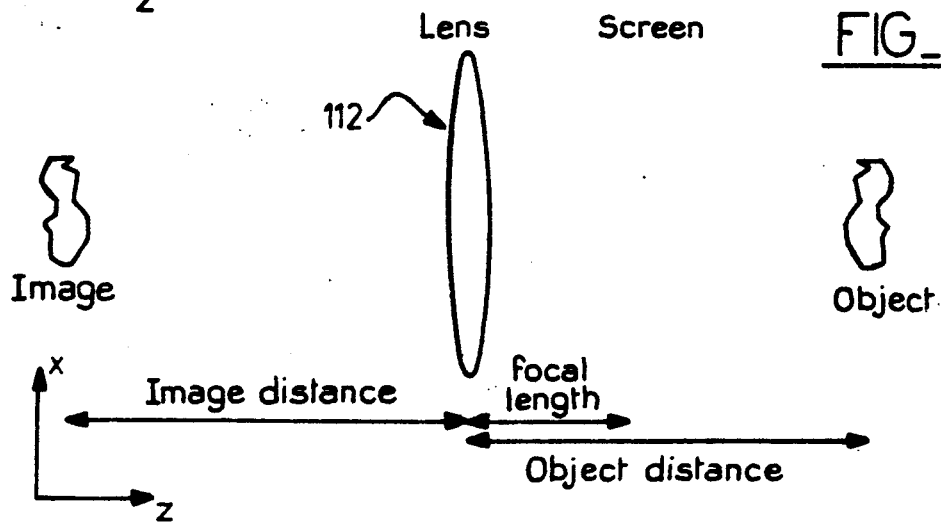
FIG_7

INCOHERENT LIGHT HOLOGRAPHIC METHOD AND APPARATUS FOR STUDYING GROUND RELIEF

The present invention relates to holography.

It relates more particularly to holography obtained using incoherent light and generally called "conoscopic holography" by the person skilled in the art.

BACKGROUND OF THE INVENTION

Apparatus for obtaining a conoscopic holograph using incoherent light is described in patent document U.S. Pat. No. 4,602,844. The apparatus described in that document includes, as illustrated diagrammatically in accompanying FIG. 1, a birefrigent crystal inserted between two circular polarizers, and a photosensitive element constituting a recording medium.

In document U.S. Pat. No. 4,602,844, the axis of the crystal is parallel to the geometrical axis of the system, i.e. perpendicular to the recording medium.

This crystal decomposes an incident ray firstly into an ordinary ray subjected to a refractive index $n_o$, and secondly into an extraordinary ray subjected to a refractive index which varies as a function of the angle of incidence $\theta$, with this variable refractive index being written $n_e(\theta)$.

These two rays propagate at different speeds within the crystal. As a result they are at different phases on leaving the crystal. Conoscopic holography is based on the fact that this phase difference is a function of the angle of incidence $\theta$. The two rays interfere on the recording medium (photographic film, CCD, ...) after passing through the outlet polarizer such that the intensity of the resulting ray is also a function of the angle $\theta$. In other words, unlike conventional holography, each incident ray produces its own reference ray. The set of rays situated on a cone whose axis is parallel to the optical axis of the crystal and having an aperture angle $\theta$ will give the same intensity on the observation plane.

As shown in accompanying FIG. 2, the conoscopic hologram of a point obtained by means of the above-mentioned apparatus corresponds to a zoned grating, i.e. to a series of concentric angular interference fringes.

The conoscopic hologram of an object is the superposition of the holograms of each of the points constituting the object. FIGS. 3b and 3c of the above-mentioned patent Document U.S. Pat. No. 4,602,844 respectively show holograms for two points and for three points of a plane object.

The resulting hologram contains all of the useful information, such that it is possible to reconstruct the initial object in three dimensions.

The conoscopic system performs a linear transformation between the object and its hologram.

The impulse response of the system which characterizes the linear transformation is written:

$$T(x',y') = 1 + \cos(ar^2) \quad (1)$$

where $r^2 = x'^2 + y'^2$, and:

$$a = 2\pi L \cdot \delta n / \lambda n_o^2 Z_c^2, \quad (2)$$

with $\lambda$ = source wavelength
$L$ = crystal length
$n_o$ = the ordinary index of the crystal
$\delta n$ = the absolute value of the difference between the ordinary index and the extraordinary index
$x,y,z$ = coordinates in the object volume
$x',y'$ = coordinates in the hologram plane $$Z_c \approx Z(x,y) - L + L/n_o \quad (3)$$

where $Z(x,y)$ is the distance between the holographic plane and the object under consideration, situated at the lateral position $(x,y)$. The Fresnel parameter $a$ can also be written:

$$a = \pi/\lambda_{eq}(Z_c)Z_c \quad (4)$$

thus defining an equivalent wavelength $\lambda_{eq}$:

$$\lambda_{eq} = \lambda n_o^2 \cdot Z_c / \delta n 2L \text{ or:} \quad (5)$$

$$a = \pi/\lambda f_c \quad (6)$$

thus defining the focal length $f_c$ of the Fresnel lens:

$$f_c = n_o^2 \cdot Z_c^2 / \delta n 2L \quad (7)$$

When the object under consideration is plane ($a$ = constant) the equivalent wavelength and the focal length $f_c$ are constants of the system.

Equation (4) then shows that the conoscopic hologram of a point recorded at a wavelength $\lambda$ is similar to the hologram of the same point recorded using coherent light (Gabor holography) at the equivalent wavelength $\lambda_{eq}$. It should be observed that the conoscopic hologram measures intensities and not amplitudes.

Since the distances $Z_c$ and L are of the same order of magnitude and since $\delta n$ is about 0.1, the wavelength $\lambda_{eq}$ is greater than the real wavelength $\lambda$ at which recording takes place: typically $\lambda_{eq} = 3$ μm to 100 μm.

As a result, the lateral resolution of the hologram (proportional to the wavelength $\lambda$) is less in conoscopic holography than in conventional holography. Its value lies around a few tens of micrometers.

As mentioned above, a hologram recorded using a conoscopic device contains all of the useful information.

For example, for a hologram of a point corresponding to a zoned grating:

the center of the zone and the object point lie on the same straight line parallel to the optical axis, and if the object point is translated transversely or laterally, then the hologram is translated identically in the holographic plane. The coordinates of the center $C(x_o,y_o)$ of the Fresnel zone are thus equal to the first two coordinates of the holographed point $P(x_o,y_o,z_o)$;

the intensity of the hologram gives the light energy in the light aperture cone; and the spacing of the fringes gives the distance between the object and the observation plane, independently of the position of the conoscopic apparatus.

The following may be written:

$$Z_c = R^2/F\lambda_{eq} \quad (8)$$

and $$Z(x,y) = Z_c + L - L/n_o = R^2/F\lambda_{eq} + L - L/n_o \quad (9)$$

where R is the radius of the Fresnel zone and F is the number of light and dark fringes on the radius.

In spite of the great hopes based on conoscopic holography as described above, it has not yet led to industrial developments.

This appears to be due to the fact that it is relatively difficult to make use of a hologram made in this way.

The object of the present invention is to propose means enabling such a hologram to be made use of more simply.

SUMMARY OF THE INVENTION

This object is achieved, according to the invention, by a holographic method of the type implementing a conoscopic system including a birefringent crystal inserted between two polarizers and a photosensitive element, wherein the method includes a step consisting in inserting one-dimensional optical means on the path of the light rays such that the conoscopic system only collects light that is parallel or quasi-parallel to a plane including the axis of the conoscopic system.

An auxiliary object of the present invention is to enable a large area of an object under investigation to be studied, for example the surface of the earth.

For this purpose, the method of the present invention advantageously includes the following steps:

providing relative displacement between the conoscopic system and the object under investigation, along a direction parallel to the mean plane of the object under investigation; and sequentially sampling the information available at the outlet from the conoscopic system and a frequency f of about v/dx where v represents the relative speed between the conoscopic system and the object under investigation, and dx represents the resolution desired in the direction of relative displacement.

The present invention also provides conoscopic apparatus of the type comprising a conoscopic system including a birefringent crystal inserted between two polarizers and a photosensitive element, wherein the apparatus includes one-dimensional optical means inserted on the path of the light rays in such a manner that the conoscopic system only collects light which is parallel or quasi-parallel to a plane including the axis of the conoscopic system.

According to another advantageous feature of the present invention, the conoscopic system includes a series of juxtaposed conoscopic assemblies disposed in the form of a rectilinear strip extending transversely to the direction of relative displacement.

BRIEF DESCRIPTION OF THE DRAWINGS

An embodiment of the invention is described by way of example with reference to the accompanying drawings, in which:

FIGS. 1 and 2 show the state of the art and are already described above;

FIG. 3 is a diagram of a system in accordance with the present invention;

FIG. 4 is a diagram showing the various components of a conoscopic photodetector assembly in accordance with the present invention;

FIG. 5 is a diagram showing four photodetector elements constituting a conoscopic photodetector assembly in accordance with the present invention; and FIGS. 6 and 7 are two mutually orthogonal diagrammatic views on respective section planes YZ and XZ through the optical means used in the present invention.

DETAILED DESCRIPTION

Figure 1:
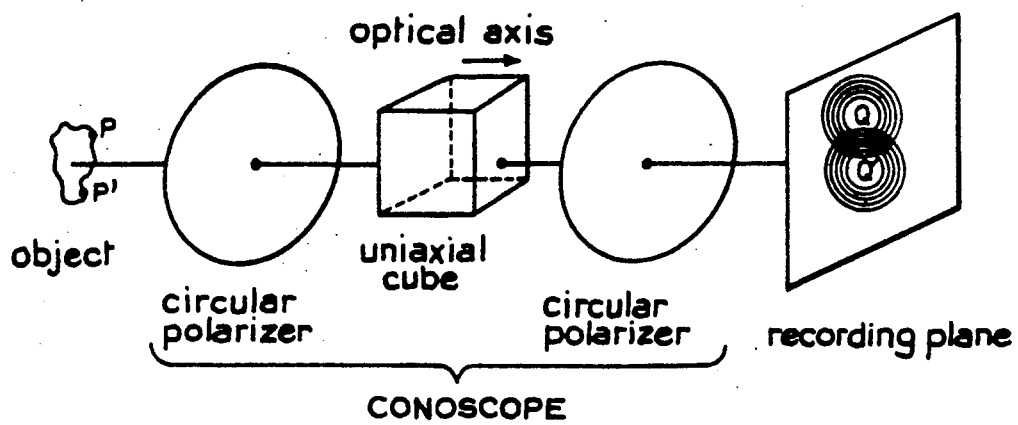
Figure 1:
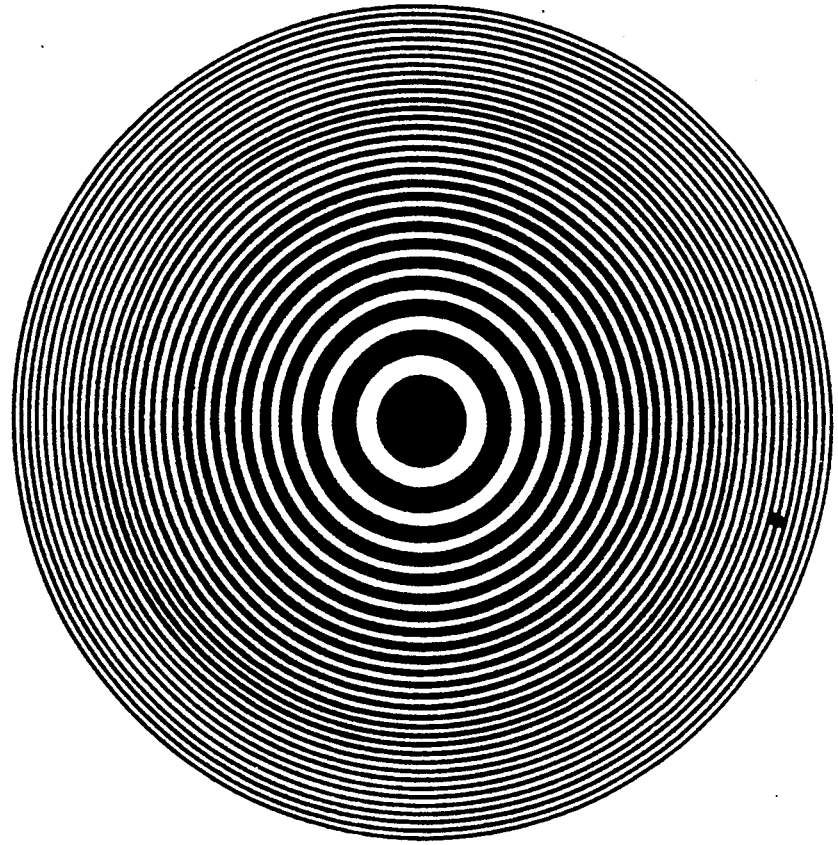

Accompanying FIGS. 3 and 4 are diagrammatic representation of a conoscopic photodetector assembly 100 comprising optical means 110 and a conoscopic element 120 for studying an object O (e.g. the surface of the Earth). This object is assumed to have a mean plane parallel to the plane defined by axes X and Y.

The conoscopic photodetector assembly 100 is placed on a vehicle, e.g. a satellite or an aircraft, which is moving parallel to the axis X as a speed v.

The optical axis 121 of the conoscopic element 120 is parallel to an axis Z (which is orthogonal to the axes X and Y).

The conoscopic element 120 includes a birefrigent crystal 122 placed between a circular polarizer 123 and an analyzer 124, followed by a photodetector 125 such as a CCD photodetector. The optical axis of the crystal 122 is parallel to the Z axis. The refractive index of the crystal is $n_o$, its birefringence is $\delta n$, and its length is L.

The optical means 100 are one-dimensional (e.g. cylindrical). They give an image in one dimension. In other words, the optical means 110 are designed in such a manner that only light which is parallel or quasi-parallel to the plane X-Z is collected by the conoscopic element.

In the diagram shown in FIGS. 6 and 7, the optical means 110 comprise a normal two-dimensional optical system 112 and a screen 114 having an aperture 115 in the object fourier plane limiting the aperture of the system to rays that are parallel or quasi-parallel to the plane X-Z. The illustration in FIGS. 6 and 7 is a theoretical diagram only. Numerous conventional optical structures are capable of performing the desired function. The optical means 110 are preferably designed to compensate for the chromatic aberration of the conoscopic system 120. They could include an interference filter for selecting a particular band of wavelengths. In addition, and preferably, a low magnification telescope is incorporated in the optical system 110 in order to increase the angle of incidence of the light rays.

As a result, the conoscopic element 100 collects light diffused by a strip of terrain of width dy and of length X=Ndx, where dy and dx are the lateral resolutions of the system, N is the number of pixels and T=dx/v is the transit time over a pixel.

As a result, a light ray (wavelength $\lambda$, intensity Io) from an object O and propagating in the X-Z plane or substantially therein (at an angle $\theta$ relative to the Z axis and at a small angle $\phi$ relative to the X-Z plane) is polarized by the first circular polarizer 123 before reaching the crystal 122.

This incident ray is split into an ordinary ray and an extraordinary ray. These two rays leave the crystal out of phase and they reach the photodetector 125 after passing through the outlet analyzer 124.

The two rays thus interfere on the photodetector 125 such that the intensity of the resulting ray is a function of the angle of incidence $\theta$.

However, the information obtained in this way by the photodetector 125 in fact includes two kinds of parasitic information corresponding respectively to a coherent continuous background or "bias" and to a conjugate image (see for example French patent application number 88 17225, file Dec. 27, 1988). This parasitic information interfers with the desired information that would otherwise suffice for reconstructing the object.

For this reason, the invention provides means for recording various different conoscopic holograms of the object under respective different polarization configurations (preferably four of them), and for combining the various conoscopic holograms obtained in this way in order to eliminate both the bias and the conjugate image.

The four polarization configurations required are the following:

(i) a circular analyzer 124 in the same direction as the polarizer 123;

(ii) a circular analyzer 124 in the opposite direction to the polarizer 123;

(iii) a linear analyzer 124 whose axis is at 45° in the X-Y plane; and (iv) a linear analyzer 124 whose axis is at −45° in the X-Z plane.

As shown diagrammatically in FIG. 5, this is preferably achieved by the outlet analyzer 124 being constituted by a matrix of four elements $124_1$, $124_2$, $124_3$, and $124_4$ corresponding to respective ones of the required polarizations, and the photodetector 125 is constituted by a matrix of four elements $125_1$, $125_2$, $125_3$, and $124_4$ respectively superposed with the above-mentioned analyzer elements.

The intensity corresponding to a given object point obtained on each of the four photodetector elements $125_1$, $125_2$, $125_3$, and $125_4$ is written $$I_{1,2,3,4} = T_{1,2,3,4} I_o \tag{10}$$

where:

$$T_1 = \cos^2(\delta\phi) \tag{11a}$$

$$T_2 = \sin^2(\delta\phi) \tag{11b}$$

$$T_3 = 1 + \sin(2\delta\phi) \tag{11c}$$

$$T_4 = 1 - \sin(2\delta\phi) \tag{11d}$$

respectively for the four elements when $$\delta\phi = (2\pi\delta nL/n_o^2)\cdot\theta^2 = a\theta^2 \tag{12}$$

and $$a = (2\pi\delta nL/\lambda n_o^2) \tag{13}$$

where a is the Fresnel constant and differs from Fresnel parameter $\alpha$ as defined above ($\alpha = a/Z_c^2$).

Processor means associated with the four elements (and represented diagrammatically under reference 200 in FIG. 3) combine the responses obtained in this way from all four elements in accordance with the following transfer function:

$$T = (T_1 - T_2) + j(T_3 - T_4). \tag{14}$$

Both the bias and the conjugate image are absent from the information obtained in this way.

This information may be written for an object point of intensity $I_m$ positioned at $x_m = mdx$ and at a height $z_m$ relative to a reference of the system in the form:

$$S(t) = I_m \exp(j[a(x_m - vt)/z_m^2]) \tag{15}$$

in which a represents the Fresnel constant as defined in equation (13).

This signal is sampled at a frequency $f = 1/T = v/dx$ such that is possible to write, as a function of time sampled in steps of size T, the current index being the variable $n_i$, the variable X being sampled in steps of size $d_x$, and the current index being m:

$$S_n = S(nT) = I_m \exp(j[a_o(m-n)^2/(z_m/z_o)^2]) \tag{16}$$

with $a_o$ being the normalized Freznel constant given by:

$$a_o = (ad_x^2/z_o^2) = (2\pi\delta nLd_x^2)/\lambda n_o^2 z_o^2 \tag{17}$$

where $\delta n$ and $n_o$ are the birefringence and the ordinary redfractive index of the crystal 122, L is its length, $\lambda$ is the wavelength of the light, and $z_o$ is the mean altitude of the vehicle relative to the object under investigation. If variation in its altitude $\delta z_m = z_m - z_o$ is so small relative to the mean altitude (which is always true of a satellite, for example) then equation (16) can be written:

$$S_n = I_m \exp[j[a_o(m-n)^2]] + jI_m\beta m(m-n)^2 \exp[j.a_o(m-n)^2]] + O(\beta) \tag{18}$$

where $\beta_m$ is the normalized altitude given by:

$$\beta_m = 2a_o\delta z_m/z_o \tag{19}$$

and O with higher order terms being negligible. For a set of N points, the following is obtained:

$$S_n = \sum_{m=n-\frac{1}{2}N}^{m=n+\frac{1}{2}N} I_m \exp[j[a_o(m-n)^2]] + jI_m\beta_m(m-n)^2\exp[j[a_o(m-n)^2]] + O(\beta) \tag{20}$$

It then suffices to deduce $I_m$ and $\beta m$ from equation (20) in order to obtain both the intensity $I_m$ and the height relative to areference of the point $x_m$.

Various different ways exist, e.g. implementing mathematical algorithms, for decorrelating the two term $I_m$ and $\beta_m$ to be found.

The simplest way consists in reconvoluting the signal $S_n$ with the function $\exp(j[-a_o(m-n)^2])$, with the mathematical formalism being greatly simplified by switching to continuous variables: equation (20) then becomes:

$$S(x) = I(x)^{} \exp(a_ox^2) + jI(x)\beta(x)^{}x^2 \exp(a_ox^2) \tag{21}$$

where ** represents convolution. Recorrelating gives:

$$\begin{aligned} T(x) &= S(x)^{}\exp[-a_ox^2] \\ &= I(x)^{}\exp[a_ox^2] + jI(x)\beta(x)^{}x^2\exp[a_ox^2]^{}\exp[-a_ox^2] \\ &= I(x) + jI(x)\beta(x) H_2(x) \end{aligned} \tag{22}$$

$H_2$ being the second order Hermite function. This processing is performed by the means 200.

In general, it will be observed that at each moment information is collated from a strip of terrain represented by N cells at a pitch $d_x$, and by juxtaposing this information over n time points (n=N) it is possible to discriminate information from each of the N cells.

More precisely, the present invention provides, as shown in FIG. 3, not just one conoscopic photodetector assembly 100, but a series of juxtaposed assemblies 100 disposed in the form of a rectilinear strip extending parallel to the Y axis.

Thus, the various mutually identical assemblies 100 each as described above collects light difused from respective parallel and juxtaposed strips of terrain of width dy and of length X=Ndx.

By processing the information collected by the various assemblies 100 it is possible to reconstitute the relief of the object under investigation, e.g. the relief of ground terrain, and to represent said relief in the form of a digital model of the terrain, i.e. a matrix of numbers in which each pixel corresponds to a value proportional to the height of the point relative to the reference.

In order to analyze an object which is very distant, e.g. Earth terrain, the optical means need to have a telescope incorporated therein.

It may be observed that the system of the present invention is passive in that it makes use of radiation diffused by the object under investigation, e.g. the Earth, and does not make use of an on-board source of radiation.

A non-limiting example is now given of the kind of performance that can be expected of the system of the present invention suitable for being installed on a vehicle such as a space shutter and travelling at a speed v of about 8000 meters per second at an average altitude $z_o$ of about 250 km.

For a ground resolution dx×dy of about 10 m ×10 m, and for a CCD detector having 4×1024 pixels, the transit time (T) is 1.25 ms and the frame frequency 0.8 KHz. It is recalled that frequencies typical of a CCD are about 10 MHz and that the time required by a specialized processor for calculating a one-dimensional fast Fourier transform (FFT) of 1024 complex points is about 1 millisecond. On-board real time processing is thus possible.

For a resolution of N points, the maximum phase shift is equal to $\pi N/4$. The length of the calcite crystal (birefringence $\delta n=0.17$, refractive index $n_o=1.42$) when the optical system includes a small (5:1) telescope is 64 mm for a blue wavelength.

The longitudinal resolution may be about 32 resolution levels over a range of 500 meters (m) giving about 15 m per level.

The present invention can be used, for example, for studying ground relief. To this end, it may be advantageous in agronomic research, but it is also advantageous in oil and mineral prospecting, in studying the environment, and in preparing civil engineering projects.

The present invention makes it possible to obtain information that can be used for reconstructing the object (intensity information and information relating to height relative to a reference) in a single pass. This constitutes a major advantage over prior art systems which require two passes with the scene being observed at two different angles and with altitude being reconstructed by triangulation. These prior two-pass apparatuses suffer from numerous drawbacks covered by the term diachronism: since the images are not taken simultaneously, significant differences of appearance may arise between the taking of two images, thereby comprising altitude calculations; changes in lighting, changes in plant cover, changes in the depth of seas or lakes, snow cover changing, changes due to human activities (planting, opencast mining, smoke, etc. . . . ).

Naturally the present invention is not limited to the particular embodiment described above but extends to any variant coming within its scope.

Instead of having a series of photodetectors disposed in the form of a strip extending parallel to the Y axis, it would be possible to use a matrix of photodetectors.

It is therefore advantageous to sum information from photodetectors observing the same area of ground (i.e. photodetectors situated substantially along a line parallel to the direction of travel).

It is also possible to use photodetectors situated at different altitudes at a known spacing in order to improve the reliability of the information obtained.

In the above description, it is assumed that the conoscopic system is moving relative to a fixed object under examination. Naturally, when the dimensions of the object make it possible, it would also be possible, conversely, to displace the object under examination relative to the conoscopic system.

In the above description, the bias and the conjugate image are eliminated by recording four holograms simultaneously corresponding to four different polarization configurations using a matrix of four polarizing elements.

It is also possible to use polarization means that are capable of rotating, as taught in French patent application number 88 17225 filed Dec. 27, 1988, and to record the various required holograms in succession.

It is also possible to eliminate the conjugate image by using the dispositions described in a patent application filed the same day as the present application and consisting essentially in inserting an aperture angle limiter on the path of the light rays either before or after the birefringent crystal, and by disposing either the birefringent crystal or else the aperture limiter off the axis. That is to say it is possible either to make use of an aperture angle limiter situated off the optical axis of the apparatus, with the birefringent crystal then being placed on the optical axis of the apparatus, or else to use an aperture angle limiter centered on the optical axis of the apparatus while the birefringent crystal has its axis inclined relative to the optical axis of the apparatus.

In this case the bias is eliminated by subtracting holograms.

We claim:

1. A holographic method of the type implementing a conoscopic system including a birefringent crystal inserted between two polarizers and a photosensitive element, wherein the method includes the steps comprising inserting one-dimensional optical means on the path of the light rays such that the conoscopic system only collects light that is parallel or quasi-parallel to a plane including the axis of the conoscopic system, providing relative displacement between the conoscopic system and the object under investigation, along a direction parallel to the mean plane of the object under investigation; and sequentially sampling the information available at the outlet from the conoscopic system.

2. A holographic method according to claim 1, wherein sampling frequency is about v/dx where v represents the relative speed between the conoscopic system and the object under examination and dx represents the resolution desired in the direction of relative displacement.

3. A holographic method according to claim 1, wherein the direction of relative displacement between the conoscopic system and the object under investigation lies parallel to the aperture plane of the one dimensional optical means.

4. A holographic method according to claim 1, wherein the conoscopic system includes a series of juxtaposed conoscopic assemblies disposed in the form of a rectilinear strip such that the various different conoscopic assemblies observe respective parallel and juxtaposed strips of the object, and wherein the strip extends transversely to the direction of relative displacement.

5. A holographic method of the type implementing a conoscopic system including a birefringent crystal inserted between two polarizers and a photosensitive element, wherein the method includes a step consisting in inserting one-dimensional optical means on the path of the light rays such that the conoscopic system only collects light that is parallel or quasi-parallel to a plane including the axis of the conoscopic system and wherein the conoscopic system includes a series of juxtaposed conoscopic assemblies disposed in the form of a rectilinear strip such that the various different conoscopic assemblies observe respective parallel and juxtaposed strips of the object.

6. A holographic method of the type implementing a conoscopic system including a birefringent crystal inserted between two polarizers and a photosensitive element, wherein the method includes the steps consisting in inserting one-dimensional optical means on the path of the light rays such that the conoscopic system only collects light that is parallel or quasi-parallel to a plane including the axis of the conoscopic system, reconvoluting the signal obtained at the outlet from the conoscopic system with the function $\exp(j-a_o(m-n)^2)$, and then recorrelating the signal obtained in this way with the function $\exp(-a_o x^2)$ with $a_o = (2\pi \delta n L d_x^2)/\lambda n_o^2 z_o^2$ where $\delta n$ = the birefringence of the crystal;
$n_o$ = the ordinary refractive index of the crystal;
$L$ = the length of the crystal;
$dx$ = the desired resolution;
$\lambda$ = the wavelength of the light; and
$z_o$ = the mean altitude of the vehicle carrying the conoscopic system.

7. Conoscopic apparatus of the type comprising a conoscopic system including a birefringent crystal inserted between two polarizers and a photosensitive element, wherein the apparatus includes one-dimensional optical means inserted on the path of the light rays in such a manner that the conoscopic system only collects light which is parallel or quasi-parallel to a plane including the axis of the conoscopic system, and wherein the conoscopic system is carried by a vehicle subjected to displacement relative to the object to be investigated in a direction parallel to the mean plane of the object to be investigated.

8. Conoscopic apparatus according to claim 7, wherein the conoscopic system includes a series of juxtaposed conoscopic assemblies disposed in the form of a rectilinear strip in such a manner that the various different conoscopic assemblies observe respective juxtaposed parallel strips of the object, and wherein the strip of assemblies extends transversely to the direction of relative displacement which is itself parallel to the aperture plane of the one-dimensional optical means.

9. Conoscopic apparatus of the type comprising a conoscopic system including a birefringent crystal inserted between two polarizers and a photosensitive element, wherein the apparatus includes one-dimensional optical means inserted on the path of the light rays in such a manner that the conoscopic system only collects light which is parallel or quasi-parallel to a plane including the axis of the conoscopic and means suitable for sequentially sampling the signal obtained at the outlet from the conoscopic system.

10. Conoscopic apparatus according to claim 9, wherein the sampling frequency f is about v/dx where v represents the relative speed between the conoscopic system and the object under investigation, and dx represents the resolution desired in the direction of relative displacement.

11. Conoscopic apparatus of the type comprising a conoscopic system including a birefringent crystal inserted between two polarizers and a photosensitive element, wherein the apparatus includes one-dimensional optical means inserted on the path of the light rays in such a manner that the conoscopic system only collects light which is parallel or quasi-parallel to a plane including the axis of the conoscopic system and wherein the conoscopic system includes a series of juxtaposed conoscopic assemblies disposed in the form of a rectilinear strip in such a manner that the various different conoscopic assemblies observe respective juxtaposed parallel strips of the object.

12. Conoscopic apparatus of the type comprising a conoscopic system including a birefringent crystal inserted between two polarizers and a photosensitive element, wherein the apparatus includes one-dimensional optical means inserted on the path of the light rays in such a manner that the conoscopic system only collects light which is parallel or quasi-parallel to a plane including the axis of the conoscopic system, and processor means suitable for:

reconvoluting the signal obtained at the outlet from the conoscopic system with the function $\exp(-j-a(m-n)^2)$, and then recorrelating the signal obtained in this way with the function $\exp(-a_o x^2)$ with $a_o = (2\pi \delta n L d_x^2)/\lambda n_o^2 z_o^2$ where $\delta n$ = the birefringence of the crystal;
$n_o$ = the ordinary refractive index of the crystal;
$L$ = the length of the crystal;
$dx$ = the desired resolution;
$\lambda$ = the wavelength of the light; and
$z_o$ = the mean altitude of the vehicle carrying the conoscopic system.

13. Conoscopic apparatus of the type comprising a conoscopic system including a birefringent crystal inserted between two polarizers and a photosensitive element, wherein the apparatus includes one-dimensional optical means inserted on the path of the light rays in such a manner that the conoscopic system only collects light which is parallel or quasi-parallel to a plane including the axis of the conoscopic system, and means for recording various different conoscopic holograms of the object using respective different polarization configurations, and for combining the various conoscopic holograms obtained in this way in order to eliminate the bias and the conjugate image.

14. Conoscopic apparatus according to claim 13, wherein each conoscopic assembly comprises:

an outlet polarizer in the form of a four-element matrix corresponding respectively to the following polarizations:
a) an outlet analyzer in the same direction as the inlet polarizer;
b) an outlet analyzer in the opposite direction to the inlet polarizer;
c) a linear analyzer whose axis is a 45° in the X-P plane; and
d) a linear analyzer whose axis is at −45° in the X-P plane, and
a photodetector, in form of a four-element matrix the elements being respectively superposed over the element of the analyzer in order to present respective transfer functions (T1, T2, T3, T4) and wherein processor means are provided suitable for combining the responses obtained in the way from the photodetector elements using the following transfer function:

$$T=(T1-T2)+j(T3-T4)$$

in order to eliminate the bias and the conjugate image.

15. Conoscopic apparatus of the type comprising a conoscopic system including a birefringent crystal inserted between two polarizers and a photosensitive element, wherein the apparatus includes one-dimensional optical means inserted on the path of the light rays in such a manner that the conoscopic system only collects light which is parallel or quasi-parallel to a plane including the axis of the conoscopic system and wherein the optical means include a telescope.

16. Conoscopic apparatus of the type comprising a conoscopic system including a birefringent crystal inserted between two polarizers and a photosensitive element, wherein the apparatus includes one-dimensional optical means inserted on the path of the light rays in such a manner that the conoscopic system only collects light which is parallel or quasi-parallel to a plane including the axis of the conoscopic system, and wherein the conoscopic system includes a series of conoscopic assemblies juxtaposed in the form of a matrix.

17. Conoscopic apparatus of the type comprising a conoscopic system including a birefringent crystal inserted between two polarizers and photosensitive element, wherein the apparatus includes one-dimensional optical means inserted on the path of the light rays in such a manner that the conoscopic system only collects light which is parallel or quasi-parallel to a plane including the axis of the conoscopic system and wherein the conoscopic system comprises conoscopic assemblies placed at different altitudes relative to an object under examination, with the altitude difference being known.

* * * * *